Patented July 26, 1932

1,868,631

UNITED STATES PATENT OFFICE

RUSSELL MERVYN DOIDGE, OF BATTERSEA, LONDON, ENGLAND, ASSIGNOR TO THE MORGAN CRUCIBLE COMPANY LIMITED, OF BATTERSEA, LONDON, ENGLAND

MANUFACTURE OF GRAPHITIC COMPOSITIONS

No Drawing. Application filed February 6, 1931, Serial No. 514,052, and in Great Britain February 7, 1930.

The present invention is for improvements in and relating to the manufacture of graphitic compositions and articles, such, for example, as crucibles, retorts, bricks, furnace linings, tubes, heat-resisting cements, electric resistance heaters and the like.

It has been previously proposed to manufacture crucibles from a mixture of natural graphite, pre-formed silicon carbide and a binder such as clay. It has also been previously proposed to make non-recrystallized crucibles and other non-recrystallized heat-resisting articles from a mixture of crystalline graphite, pre-formed silicon carbide, or other refractory electric furnace product such as fused alumina or fused silica, a carbonizable material to provide a permanent carbon-binder, and a flux to act as a protective coating to the elements of the composition.

Now, according to the present invention, a graphitic composition is bonded by a refractory material itself. The invention is the outcome of research which has shown that when a mixture comprising graphite in excess and metallic silicon is heated at a sufficiently high temperature to cause reaction between the carbon and the silicon, not only is silicon carbide formed, but the mass also becomes bonded to a greater or lesser degree by the carbide so produced in situ, and hence there may be obtained as desired a material which is self-strengthening in actual use or which is directly heat-finished. The products in the latter condition are possessed of a high degree of strength, and in particular of resistance to erosion by slags and fluxes, so that, even when the component of any auxiliary bond, such as clay, is more or less readily attacked, this resistance persists and confers the property of improved uniform wear upon the refractory, which in the case of crucibles and the like can be used until worn down very thin before failure occurs. On the other hand, as metallic silicon in a mixture as aforesaid undergoes progressive conversion into carbide, the invention permits of the obtention of self-strengthening refractory compositions and articles, the production of which carries with it the economic recommendation that the heat-energy requisite to secure the said advantages of mechanical and chemical resistance of the heat-finished material is supplied in the process of use instead of independently in the process of final manufacture alone.

According to the present invention therefore, a process of manufacture of a graphitic composition is characterized by forming into a cohesive mass a mixture comprising metallic silicon and graphitic carbon in quantity in excess over the silicon equivalent and then heating the mass to consolidate it and produce therein a silicon-carbide bond.

Thus, such a mixture brought to an appropriate condition of cohesion by addition of the requisite quantity of a bonding vehicle may be shaped to the form of the article desired, and then consolidated by heat at a temperature sufficient to bring about the combination of the silicon with the carbon to the degree desired.

As already indicated, the heating may be to the stage of production of a heat-finished material, that is to say, one in which no substantial change is produced by further heating, or to an intermediate stage with production of a material of self-strengthening character. If, for instance, the mixture formed as a crucible, be fired at a comparatively low temperature, say 800° C., so as to produce an article sufficiently consolidated for use, such crucible is employable for melting iron or brass, the further production of the silicon carbide bond proceeding during the process of use with consequent increase in the mechanical strength and chemical resistance of the article. But as firing at comparatively low heat insufficiently prolonged, or at higher temperature for too short a time, tends to give products relatively weak and friable and hence demanding trouble and care in the initial stages of their use, it is preferred for articles such, for instance, as crucibles, which are liable to rough usage or much handling, to subject the formed mass to heat until the silicon carbide bond is developed as far as possible, and an article of the maximum attainable strength for a particular composition is produced.

The preferred method of operation is most conveniently effected by burning at a high temperature, for example, from 1200°–1500° C. The process may be commenced at a comparatively low temperature, say 800° C., and then completed to the stage desired at the higher temperature. As will be appreciated, the temperature factor is variable, depending, for instance, upon the time of heating and the nature or size of the particular article, the specific temperatures just given being, of course, by way of example. At the higher temperatures, what is known as "recrystallization" may take place.

A graphitic material according to this invention may therefore consist of a graphitic composition bonded with silicon carbide and comprising metallic silicon, or a composition wherein such initially employed silicon is wholly or for the greater part in the form of a carbide-bond; and such composition may be heat-finished, undergoing no substantial change on further heating, or may be merely heat-consolidated to some lesser degree and convertible by actual use as a refractory to the condition of the mechanically and chemically more resistant heat-finished product, the comparative initial fragility being of no detriment for a number of purposes for which graphitic refractory compositions are employed.

The composition may be formed essentially entirely from silicon carbide produced in situ and graphitic carbon in excess. For example, by heating a mixture compounded of 60 parts of plumbago and 40 parts of metallic silicon and a temporary bonding vehicle to about 1500° C., a tough, coherent body is obtainable which is substantially free from metallic silicon and is bound by the silicon carbide formed by combination of the silicon with part of the graphitic carbon during the heating period.

In its more generally applicable modification, however, the process of manufacture of a graphitic composition according to the invention consists in heating a mixture as aforesaid which comprises, in addition to graphitic carbon in excess and a proportion of metallic silicon, another refractory material as an essential component of the composition.

Said other refractory material may be preformed silicon carbide itself, fused alumina or fused silica or other refractory product of the electric furnace or, in general, any other refractory material, for example, quartz sand, chamotte or magnesia. Two or more such refractory materials may be employed together.

The relative proportions of the refractory components may vary within considerable limits according, for instance, to the nature and the intended use of the particular article in view. For crucibles, the average content of graphite may be said to lie between 20 and 50 per cent. For the manufacture of a medium size melting-crucible 30–50 per cent has been found to be a generally utilizable proportion, but for this and other purposes, the proportion of this element may be considerably lower or considerably higher than this figure. Thus, for certain articles 10 per cent or less graphite may suffice. The following table gives examples of various relative proportions of graphite, silicon and silicon carbide, which may be used according to the purpose for which the articles are intended, but, as will be understood, these proportions may be varied and, like the proportions and temperatures already mentioned, are given by way of illustration and not in limitation of the invention.

|  | Parts by weight | | | |
| --- | --- | --- | --- | --- |
| Graphitic carbon (e. g. plumbago) | 20 | 35 | 55 | 60 |
| Silicon carbide or equivalent | 60 | 55 | 20 | |
| Metallic silicon | 20 | 10 | 25 | 40 |

The metallic silicon may be employed in the form of free silicon itself or in the form of a derivative which will yield elemental silicon under the conditions of reaction, for example, an aluminum-silicon alloy, or a ferro-silicon, preferably of a high silicon content, for instance, 90 per cent silicon.

The components of the composition are compounded together in a sufficient state of sub-division to ensure satisfactory admixture. The graphite may be relatively coarsely sub-divided, for example, flake of a fineness to pass a sieve of ten meshes per inch, but the silicon carbide or its equivalent and the metallic silicon or mother-substance thereof are preferably used in a finer condition, for example, of a fineness to pass a fifty-mesh sieve. A portion of the graphite may be in a finely sub-divided state, or in alternative or addition other fine carbon, for instance, "amorphous" naturally occurring plumbago, lamp black, or powdered retort-carbon, may be included, carbon in fine sub-division facilitating the formation of the silicon carbide.

As a bonding vehicle for the purpose of facilitating the shaping or other primary utilization of the initial mixture there may be employed tar, molasses and the like, or clay or other colloidal alumino-silicates. Pitch is an advantageous bonding-agent, and may be brought to a suitable consistency by admixture with a small proportion of tar-oil or like excipient. Such bonding vehicles for the purpose in question are used in a quantity requisite to make a sufficiently cohesive mass for the particular after treatment in view, and the choice of bonding agent is in general to be determined by such consideration, for example, by the method of manufacture which is in contemplation for a given article, such as spinning, casting, pressing or moulding by hand. For some of these methods and for some other purposes, for instance, cementing, a bonding vehicle is not absolutely necessary, but is usually desirable for shaped objects to give strength to allow for handling. For moulding with a roller-former, the vehicle may be in just such proportion as to produce a damp dust which binds in the hand; but a simple preliminary experiment is all that is necessary in order to determine the quantity of such agent to produce the best consistency for the special operation in view. Clay has been found a suitable vehicle when the article is to be shaped by casting or spinning. The clay or the like and the primary materials may be compounded together with sufficient water to render the mixture suitable for treatment by any of the methods well known to potters, such as casting, spinning, pressing, or moulding by hand. For example, the mixture may be compounded with a small proportion of clay and then mixed with sufficient water to convert the whole into a fairly thick cream, the function of the clay here being essentially that of a carrier which prevents premature settling of the heavier components of the mixture. About 5 per cent of clay relatively to the solid mixture may suffice for this purpose.

To facilitate the handling and general utilization of articles liable to rough conditions of use, the quantity of bonding vehicle incorporated with the primary components of the article may be increased. For instance, crucibles made with substantially 5 per cent of clay, according to Example II hereafter, although sufficiently strong for most purposes, may not possess sufficient toughness to enable them to withstand the more or less rough handling to which such articles are frequently subjected. Increase in the amount of silicon, while augmenting the strength of the material, may cause decreased resistance to sudden temperature changes. In such circumstances, a supplementary bond provided by the use of a bonding vehicle as aforesaid, for example, clay, or a carbonizing substance such as tar, is of advantage for "general utility" articles. Such supplementary bond may be provided by increasing the proportion of clay to, for example, 15–35 per cent or by use of a carbonizing substance such as tar or molasses in a proportion of, say 25 per cent. These proportions are, of course, by way of example, and the requisite increased quantity of such bonding vehicles is to be determined for any given composition by the object in view, namely, the production of an article of improved toughness and resistance to handling. An additional advantage of clay or like alumino-silicate in sufficient proportion to give a plastic mass is that the ordinary relatively inexpensive clay-working plant may be used. One of the most valuable properties of silicon is the resistance which this element confers upon the refractory, after appropriate burning, to erosion by slags and fluxes, especially those fluxes which are used in cleaning metals, such as borax, salt and the like, and this property is unimpaired by the presence of clay or the like even though the clay or the like may itself be rapidly dissolved. It is believed that this result is due to the silicon carbide bond produced by the reaction under heat between the elemental silicon and the carbon; and that this bonding property of the silicon carbide enables the refractory to be used until worn down very thin without failure even when the auxiliary bond of clay or the like is, from the proportion of such substances, apparently the predominating bond.

*Example I*

A mixture was made up consisting of plumbago, silicon carbide and metallic silicon, all in a state of sub-division and in the respective proportions of 25, 55 and 20 parts by weight; and these components were intimately admixed and compounded with sufficient tar to produce a damp, lightly cohesive mass. This mass was introduced into a machine comprising a mould having an internal shape corresponding to that of a crucible. The mould rotated about its axis so that an eccentrically disposed arm, likewise rotatable, projecting into the mould, rolled and pressed the mass as the mould rotated against the inner wall of the latter. The mould was provided at the rim with an inwardly extending flange arranged so as to prevent the mass as it was being worked by the roller from rising up the inner wall of the mould, and thus ensure that a correctly formed rim was produced upon the open end of the crucible so moulded.

The crucible thus shaped was enclosed in a sagger and heat-finished by firing to a temperature of about 1400° C., care being observed to heat sufficiently slowly to prevent blistering or fracture by too rapid production of the gases evolved from the temporary binder.

*Example II*

A mixture was made up of plumbago, silicon carbide, a metallic silicon and clay in the respective proportions of 35, 40, 20 and 5 parts by weight. To this mixture sufficient water was added to produce a thick cream. This cream was then cast into the form of a crucible in a mould by the method of press casting as described in British specification No. 313,185. The cast article was dried, coated with a glaze, and heat-finished by firing to a temperature of about 1500° C. in an open-fired oil furnace over a period of from 3–4 hours. In this case the amount of volatile matter to be expelled was very small and the rate of heating was, as shown, quite rapid. It may here be observed that a signal advantage of the invention operated by casting the initial composition wherein a small amount of clay or the like is the only bonding vehicle is the great rapidity with which the ware can be dried and burnt, the firing process frequently taking but a few hours as compared with the several days or even sometimes weeks which may be necessary for the like ordinary clay-bonded or carbon-heated articles usually made.

*Example III*

A mixture was made up of 40 parts of graphite, 20 parts of silicon carbide, 20 parts of metallic silicon, and 20 parts of clay. This mixture was worked into a plastic mass with water and was shaped into the form of a crucible by means of a profile and a rotating mould in the manner well known to potters. The crucible was dried and then kilned at a temperature somewhat exceeding 1400° C.

*Example IV*

The primary mixture in this case was composed of 45 parts of graphite, 20 parts of silicon and 35 parts of clay. The mixture was treated as in the previous example and kilned at a temperature somewhat exceeding 1400° C.

Articles, such as crucibles, produced according to the preceding Examples III and IV combine the properties of extra toughness and chemical resistance derived from the silicon carbide bond with the usual strength and convenience in handling during manufacture derived from the clay present in substantially high proportion.

In either process of manufacture, the article may, with advantage, be coated with a glaze or a flux previous to firing.

The bonding vehicles exemplified above by tar, molasses and the like may tend to leave a residue of carbon, and all or part of this carbon may combine with the silicon during firing or use. It will be appreciated, however, that they are not used as has been previously proposed to constitute a permanent binding agent for the refractory; they are used to facilitate the manipulation of the initial composition and, in higher proportion, to increase the toughness of the article; they probably have a binding action, but the binding agent according to the present invention is essentially the silicon carbide which is formed in situ during the burning process and imparts an improved degree of strength and hardness to the refractory as is shown by the resistance to wear and increased life of the articles even under conditions destructive of the auxiliary bonding agent.

As previously stated, it has already been proposed to use a flux in the manufacture of graphitic refractories, and a flux may be advantageously employed as an addition to the mixing according to this invention for the purpose of providing protection from oxidation for the components of the refractory. Such a flux may be borax, feldspar, Cornish stone or clay, or some similar material with a melting point depending on the condition of use. Glaze may also be applied by painting, spraying or dipping, either before or after burning.

I claim:—

1. A graphitic composition substantially chemically unalterable by heat bonded with silicon carbide produced in situ and containing in addition to said silicon carbide an electric furnace refractory product.

2. A graphitic composition substantially chemically unalterable by heat bonded with silicon carbide produced in situ and containing an auxiliary bonding-agent.

3. A graphitic composition substantially chemically unalterable by heat bonded with silicon carbide produced in situ and containing a colloidal alumino-silicate as an auxiliary bonding-agent.

4. A graphitic composition substantially chemically unalterable by heat bonded with silicon carbide produced in situ containing substantially 15–35 per cent. of clay as an auxiliary bonding-agent.

5. A graphitic composition substantially chemically unalterable by heat bonded with silicon carbide produced in situ containing an auxiliary bonding-agent and an electric furnace refractory product.

6. A graphitic refractory substantially chemically unalterable by heat bonded with silicon carbide produced in situ containing substantially 15–35 per cent. of clay as an auxiliary bonding-agent and in addition to the said silicon carbide another refractory material.

7. A graphitic refractory substantially chemically unalterable by heat bonded with silicon carbide produced in situ containing preformed silicon carbide and substantially 15 to 35 per cent of clay as an auxiliary bonding-agent.

8. A graphitic composition substantially chemically unalterable by heat bonded with silicon carbide produced in situ containing graphitic carbon and silicon as mother substances of such carbide in substantially the relative proportions of 60–40 per cent.

9. A graphitic composition substantially chemically unalterable by heat bonded with silicon carbide produced in situ, containing graphitic carbon, silicon carbide produced in situ, and another refractory material in substantially the respective proportions of graphite 55–20 per cent, silicon as mother substance of said silicon carbide 25–10 per cent, and 20–60 per cent of the other refractory material.

10. A graphitic composition substantially chemically unalterable by heat bonded with silicon carbide produced in situ containing graphitic carbon, silicon carbide produced in situ, and another refractory material in substantially the respective proportions of graphite 55-20 per cent, silicon as mother substance of said silicon carbide 25-10 per cent, 20-60 per cent. of the other refractory material and 15-35 per cent. of clay as an auxiliary bonding-agent.

11. The manufacture of a graphitic composition which consists in forming into a cohesive mass a mixture comprising metallic silicon and graphitic carbon in quantity in excess over the silicon equivalent and an electric-furnace refractory product and heating the mass to consolidate it and form therein a silicon carbide bond to the degree of producing an article substantially unalterable on further heating.

12. The manufacture of a graphitic composition which consists in forming into a cohesive mass a mixture comprising metallic silicon, a bonding vehicle containing sufficient bonding-agent to provide in the heated product an auxiliary bond, and graphitic carbon in quantity in excess over the silicon equivalent, and heating the mass to consolidate it and form therein a silicon carbide bond to the degree of producing an article substantially unalterable on further heating.

13. The manufacture of a graphitic composition which consists in forming into a cohesive mass a mixture comprising metallic silicon, aqueous clay containing sufficient clay to provide in the heated product an auxiliary bond, graphitic carbon in quantity in excess over the silicon equivalent, and a refractory material, and heating the mass to consolidate it and form therein a silicon carbide bond to the degree of producing an article substantially unalterable on further heating.

14. The manufacture of a graphitic composition which consists in forming into a cohesive mass a mixture comprising metallic silicon, graphitic carbon and refractory material between substantially the respective proportions of 25-10 per cent., 20-55 per cent. and 20-60 per cent. and heating the mass to a degree to obtain a product substantially unalterable on further heating.

15. The manufacture of a graphitic composition which consists in forming into a cohesive mass a mixture comprising metallic silicon and graphitic carbon in quantity in excess over the silicon equivalent and additional carbon in fine subdivision, and heating the mass to a degree to obtain a product substantially unalterable on further heating.

RUSSELL MERVYN DOIDGE.